US012166785B2

(12) United States Patent
Yellapragada et al.

(10) Patent No.: US 12,166,785 B2
(45) Date of Patent: *Dec. 10, 2024

(54) SYSTEMS AND METHODS FOR PREDICTIVE ANALYSIS OF POTENTIAL ATTACK PATTERNS BASED ON CONTEXTUAL SECURITY INFORMATION

(71) Applicant: SecureX.AI, Inc., San Jose, CA (US)

(72) Inventors: Venkata Ramani Yellapragada, Calgary (CA); Harjinder Singh, San Jose, CA (US)

(73) Assignee: SecureX.AI, Inc., San Jose, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/563,889

(22) Filed: Dec. 28, 2021

(65) Prior Publication Data

US 2023/0208870 A1 Jun. 29, 2023

(51) Int. Cl.
*H04L 9/40* (2022.01)
*G06F 21/53* (2013.01)
*G06N 20/00* (2019.01)

(52) U.S. Cl.
CPC .......... *H04L 63/1433* (2013.01); *G06F 21/53* (2013.01); *G06N 20/00* (2019.01);
(Continued)

(58) Field of Classification Search
CPC ............. H04L 63/1433; H04L 63/1416; H04L 63/1425; H04L 63/1466; H04L 63/1441;
(Continued)

(56) References Cited

U.S. PATENT DOCUMENTS 7,650,640 B1 * 1/2010 Levy ................ G06F 21/52
726/23
7,797,752 B1 * 9/2010 Vaidya ............... H04L 12/4641
717/172

(Continued)

OTHER PUBLICATIONS

ORCA Security, "SideScanning(trademark)—Inside the Engine that Powers Orca Security", SideScanning(trademark) Technical Brief, 2020, pp. 1-19.

(Continued)

*Primary Examiner* — Aravind K Moorthy
(74) *Attorney, Agent, or Firm* — NICHOLSON DE VOS WEBSTER & ELLIOTT LLP

(57) ABSTRACT

Systems and methods for predictive analysis of potential attack patterns based on contextual security information are described. In one embodiment, a method includes generating a profile for an enterprise that indicates one or more software application stacks and a network architecture for the one or more software application stacks; determining one or more vulnerabilities of the one or more software application stacks and one or more vulnerabilities of the network architecture; providing the one or more vulnerabilities of the one or more software application stacks, the one or more vulnerabilities of the network architecture, and the profile as input to a machine learning model; generating an inference by the machine learning model that indicates one or more attack paths for an attacker in the one or more software application stacks and the network architecture; and transmitting the inference to a storage location or a security software application.

20 Claims, 8 Drawing Sheets

(52) U.S. Cl.
CPC ...... *H04L 63/1416* (2013.01); *H04L 63/1425* (2013.01); *H04L 63/1466* (2013.01)

(58) Field of Classification Search
CPC ....... H04L 63/20; G06F 21/53; G06F 21/577; G06N 20/00
See application file for complete search history.

(56) References Cited

U.S. PATENT DOCUMENTS

| | | | |
|---|---|---|---|
| 9,043,922 B1 | 5/2015 | Dumitras et al. | |
| 9,058,492 B1* | 6/2015 | Satish | G06F 21/57 |
| 9,215,158 B1* | 12/2015 | Adogla | H04L 67/10 |
| 9,544,327 B1 | 1/2017 | Sharma et al. | |
| 9,619,772 B1* | 4/2017 | Adogla | G06Q 10/0635 |
| 9,741,005 B1* | 8/2017 | Adogla | G06Q 10/0635 |
| 10,009,360 B1 | 6/2018 | Todd et al. | |
| 10,114,954 B1 | 10/2018 | Bellis et al. | |
| 10,140,453 B1* | 11/2018 | Fridakis | G06F 21/577 |
| 10,185,832 B2 | 1/2019 | Cam | |
| 10,298,599 B1* | 5/2019 | Zhang | H04L 63/1416 |
| 10,348,695 B1* | 7/2019 | Khassanov | G06F 12/1408 |
| 10,657,262 B1* | 5/2020 | Cui | G06F 21/54 |
| 10,796,005 B1 | 10/2020 | Yi et al. | |
| 11,138,317 B2 | 10/2021 | Ramasamy et al. | |
| 11,233,815 B1 | 1/2022 | Rose | |
| 11,245,731 B1* | 2/2022 | Guruswamy | H04L 63/105 |
| 11,283,824 B1 | 3/2022 | Berger et al. | |
| 11,372,969 B1* | 6/2022 | Sundahl | G06F 21/577 |
| 11,509,682 B1 | 11/2022 | Paget et al. | |
| 11,539,738 B1 | 12/2022 | Lancioni et al. | |
| 11,558,414 B1 | 1/2023 | Man | |
| 11,563,772 B2* | 1/2023 | Doron | H04L 43/0876 |
| 11,568,057 B2 | 1/2023 | Handurukande et al. | |
| 11,720,686 B1 | 8/2023 | Cross et al. | |
| 11,757,907 B1 | 9/2023 | Berger et al. | |
| 11,777,992 B1 | 10/2023 | Cross et al. | |
| 11,947,946 B1 | 4/2024 | Rao | |
| 11,983,094 B2 | 5/2024 | Downie et al. | |
| 11,989,307 B2 | 5/2024 | Hercock et al. | |
| 12,015,630 B1 | 6/2024 | Cross et al. | |
| 2002/0144141 A1* | 10/2002 | Edwards | G06F 21/577 726/25 |
| 2003/0033542 A1 | 2/2003 | Goseva-Popstojanova et al. | |
| 2003/0084330 A1 | 5/2003 | Tarquini et al. | |
| 2003/0154399 A1 | 8/2003 | Zuk et al. | |
| 2004/0088565 A1 | 5/2004 | Norman et al. | |
| 2005/0044418 A1 | 2/2005 | Miliefsky | |
| 2005/0273854 A1* | 12/2005 | Chess | G06F 21/577 713/188 |
| 2006/0021054 A1* | 1/2006 | Costa | G06F 21/566 726/25 |
| 2007/0192867 A1 | 8/2007 | Miliefsky | |
| 2007/0199050 A1 | 8/2007 | Meier | |
| 2009/0113550 A1* | 4/2009 | Costa | G06F 21/55 726/25 |
| 2010/0205297 A1* | 8/2010 | Sarathy | H04L 43/00 709/224 |
| 2010/0205657 A1* | 8/2010 | Manring | G06F 21/6218 726/5 |
| 2010/0205665 A1* | 8/2010 | Komili | H04L 67/564 726/12 |
| 2010/0242082 A1* | 9/2010 | Keene | H04W 12/065 726/1 |
| 2010/0242088 A1* | 9/2010 | Thomas | G06F 21/554 726/4 |
| 2010/0251363 A1* | 9/2010 | Todorovic | G06F 21/56 718/1 |
| 2010/0262688 A1 | 10/2010 | Hussain et al. | |
| 2010/0333177 A1* | 12/2010 | Donley | H04L 63/1416 726/4 |
| 2011/0023118 A1* | 1/2011 | Wright | H04L 63/1441 726/23 |
| 2011/0067105 A1* | 3/2011 | Wolfe | G06F 21/53 718/1 |
| 2011/0214157 A1* | 9/2011 | Korsunsky | H04L 63/1458 726/1 |
| 2011/0231564 A1* | 9/2011 | Korsunsky | H04L 63/1483 709/231 |
| 2012/0036580 A1* | 2/2012 | Gorny | H04L 63/101 726/25 |
| 2012/0066762 A1* | 3/2012 | Todorovic | G06F 21/53 726/22 |
| 2013/0179991 A1* | 7/2013 | White | G06F 21/53 726/29 |
| 2013/0227634 A1 | 8/2013 | Pal et al. | |
| 2013/0312058 A1* | 11/2013 | Thompson | G06F 21/54 726/1 |
| 2013/0347052 A1* | 12/2013 | Choudrie | G06F 21/577 726/1 |
| 2014/0115703 A1* | 4/2014 | Penton | G06F 21/554 726/23 |
| 2014/0157355 A1* | 6/2014 | Clancy, III | H04W 12/08 726/1 |
| 2014/0157405 A1* | 6/2014 | Joll | H04L 63/1425 726/22 |
| 2014/0165204 A1* | 6/2014 | Williams | G06F 21/55 726/25 |
| 2014/0189875 A1* | 7/2014 | Beskrovny | H04L 63/1433 726/25 |
| 2014/0201807 A1* | 7/2014 | White | G06F 21/53 726/1 |
| 2014/0283136 A1* | 9/2014 | Dougherty | H04W 64/00 726/29 |
| 2015/0074792 A1 | 3/2015 | Tarreau | |
| 2015/0172300 A1* | 6/2015 | Cochenour | G06F 21/6218 726/23 |
| 2015/0172307 A1 | 6/2015 | Borohovski et al. | |
| 2015/0172308 A1 | 6/2015 | Borohovski et al. | |
| 2015/0350213 A1 | 12/2015 | Varadarajan et al. | |
| 2015/0381637 A1* | 12/2015 | Raff | H04L 63/0218 726/23 |
| 2016/0078231 A1 | 3/2016 | Bach et al. | |
| 2016/0149947 A1 | 5/2016 | Bronshtein et al. | |
| 2016/0156655 A1* | 6/2016 | Lotem | H04L 63/1416 726/23 |
| 2016/0180096 A1* | 6/2016 | Sharma | G06F 21/577 726/25 |
| 2016/0191554 A1 | 6/2016 | Kaminsky | |
| 2016/0301676 A1* | 10/2016 | Gounares | H04L 63/0428 |
| 2016/0315960 A1* | 10/2016 | Teilhet | G06F 21/55 |
| 2016/0366156 A1 | 12/2016 | Kantor et al. | |
| 2017/0046518 A1* | 2/2017 | Chen | G06F 21/566 |
| 2017/0111335 A1* | 4/2017 | Hibbert | H04L 63/083 |
| 2017/0142072 A1* | 5/2017 | Reubenstein | H04L 63/1441 |
| 2017/0255544 A1* | 9/2017 | Plate | G06F 21/577 |
| 2017/0262387 A1* | 9/2017 | Sell | G06F 12/0864 |
| 2017/0324760 A1* | 11/2017 | Gorny | H04L 63/1425 |
| 2017/0329979 A1* | 11/2017 | Behl | G06F 21/74 |
| 2017/0337123 A1* | 11/2017 | Wang | G06F 11/3688 |
| 2017/0359308 A1 | 12/2017 | Pal et al. | |
| 2018/0048674 A1* | 2/2018 | Black | H04W 12/041 |
| 2018/0077188 A1 | 3/2018 | Mandyam et al. | |
| 2018/0077195 A1 | 3/2018 | Gathala et al. | |
| 2018/0115586 A1 | 4/2018 | Chou et al. | |
| 2018/0121659 A1 | 5/2018 | Sawhney et al. | |
| 2018/0157844 A1* | 6/2018 | Duer | G06F 21/577 |
| 2018/0157845 A1 | 6/2018 | Mehta | |
| 2018/0183827 A1 | 6/2018 | Zorlular et al. | |
| 2018/0205755 A1 | 7/2018 | Kavi et al. | |
| 2018/0375897 A1* | 12/2018 | Kawasaki | H04L 63/1491 |
| 2019/0042730 A1* | 2/2019 | Yamada | G06F 21/554 |
| 2019/0050230 A1* | 2/2019 | Branco | G06F 21/55 |
| 2019/0050319 A1 | 2/2019 | Gondalia et al. | |
| 2019/0130128 A1* | 5/2019 | Khassanov | H04L 9/30 |
| 2019/0164389 A1* | 5/2019 | Whytock | G07F 19/205 |
| 2019/0207978 A1 | 7/2019 | Thompson et al. | |
| 2019/0243964 A1* | 8/2019 | Shukla | G06F 21/54 |
| 2019/0258807 A1* | 8/2019 | DiMaggio | G06F 21/577 |
| 2019/0306178 A1 | 10/2019 | Weizman et al. | |

(56) References Cited

U.S. PATENT DOCUMENTS

| | | |
|---|---|---|
| 2019/0327311 A1* | 10/2019 | Khassanov ............. H04L 67/02 |
| 2019/0347424 A1 | 11/2019 | Bezzi et al. |
| 2019/0354765 A1* | 11/2019 | Chan ................. H04N 21/2187 |
| 2020/0057857 A1 | 2/2020 | Roytman et al. |
| 2020/0057858 A1 | 2/2020 | Sharma et al. |
| 2020/0074084 A1 | 3/2020 | Dorrans et al. |
| 2020/0153850 A1 | 5/2020 | Krishnan et al. |
| 2020/0259788 A1* | 8/2020 | Lukiyan ..................... G06F 8/30 |
| 2020/0259856 A1* | 8/2020 | Lukiyan .............. H04L 63/1416 |
| 2020/0327237 A1* | 10/2020 | Shakarian ............... G06F 17/18 |
| 2020/0349259 A1* | 11/2020 | Tsai ....................... G06F 21/562 |
| 2020/0351306 A1 | 11/2020 | Nedbal et al. |
| 2020/0364349 A1 | 11/2020 | Nunes et al. |
| 2020/0394335 A1* | 12/2020 | Cottrill ................... G06F 21/54 |
| 2021/0034602 A1 | 2/2021 | Levacher et al. |
| 2021/0081545 A1* | 3/2021 | Mulligan ........... G06F 9/45558 |
| 2021/0124830 A1 | 4/2021 | Dinh et al. |
| 2021/0126936 A1 | 4/2021 | Gerber, Jr. |
| 2021/0136111 A1* | 5/2021 | Russinovich ........... H04L 63/18 |
| 2021/0141899 A1* | 5/2021 | Candido De Lima Junior ........... G06F 8/41 |
| 2021/0160272 A1 | 5/2021 | Mehandale et al. |
| 2021/0194917 A1 | 6/2021 | Ross |
| 2021/0204116 A1* | 7/2021 | Naujok ................... H04L 67/01 |
| 2021/0211453 A1 | 7/2021 | Cooney et al. |
| 2021/0218771 A1 | 7/2021 | Khouderchah et al. |
| 2021/0232593 A1 | 7/2021 | Hamdi |
| 2021/0243216 A1 | 8/2021 | Shivanna et al. |
| 2021/0273969 A1* | 9/2021 | Shakarian ............... G06F 40/20 |
| 2021/0279337 A1* | 9/2021 | Mosby ................... G06N 20/00 |
| 2021/0342450 A1 | 11/2021 | Patel et al. |
| 2021/0342836 A1* | 11/2021 | Cella ..................... H04L 9/3239 |
| 2021/0398225 A1* | 12/2021 | Crabtree ............ G06Q 30/0611 |
| 2022/0004643 A1 | 1/2022 | Sloane et al. |
| 2022/0012340 A1 | 1/2022 | Rao et al. |
| 2022/0067174 A1 | 3/2022 | Gupta |
| 2022/0070279 A1* | 3/2022 | Pang .................... H04L 67/133 |
| 2022/0078203 A1 | 3/2022 | Shakarian et al. |
| 2022/0083644 A1* | 3/2022 | Kulshreshtha .......... G06F 21/52 |
| 2022/0083667 A1 | 3/2022 | Anwar et al. |
| 2022/0103529 A1* | 3/2022 | Johnson ................. G06F 21/32 |
| 2022/0109685 A1* | 4/2022 | Hankins .............. H04L 63/0227 |
| 2022/0129561 A1 | 4/2022 | Shivanna et al. |
| 2022/0147533 A1 | 5/2022 | Shakarian et al. |
| 2022/0150271 A1 | 5/2022 | Shah |
| 2022/0179978 A1 | 6/2022 | Stroila et al. |
| 2022/0210141 A1 | 6/2022 | Parekh et al. |
| 2022/0237300 A1 | 7/2022 | Regev et al. |
| 2022/0269791 A1 | 8/2022 | Ansell et al. |
| 2022/0286475 A1 | 9/2022 | Mullaney |
| 2022/0294817 A1 | 9/2022 | Parekh et al. |
| 2022/0335135 A1 | 10/2022 | McGraw et al. |
| 2022/0374528 A1 | 11/2022 | Isoyama et al. |
| 2022/0400135 A1 | 12/2022 | Gamra |
| 2023/0019180 A1 | 1/2023 | De et al. |
| 2023/0021414 A1 | 1/2023 | Kumar |
| 2023/0041068 A1 | 2/2023 | Starin et al. |
| 2023/0069738 A1 | 3/2023 | Sreedhar et al. |
| 2023/0120174 A1 | 4/2023 | Seck et al. |
| 2023/0169175 A1 | 6/2023 | Ananthapur et al. |
| 2023/0185921 A1 | 6/2023 | Karas et al. |
| 2023/0208870 A1 | 6/2023 | Yellapragada et al. |

OTHER PUBLICATIONS

Non-Final Office Action, U.S. Appl. No. 17/902,216, Aug. 7, 2024, 19 pages.

Notice of Allowance, U.S. Appl. No. 17/838,800, Jul. 10, 2024, 12 pages.

* cited by examiner

SYSTEMS AND METHODS FOR PREDICTIVE ANALYSIS OF POTENTIAL ATTACK PATTERNS BASED ON CONTEXTUAL SECURITY INFORMATION

As the world increasingly relies on computers and computer networks, there is an increasing opportunity to secure the applications running on those computers and secure the networks coupling those computers together. Such security is to prevent, detect, and monitor unauthorized access, misuse, modification, or denial of a computer and computer network.

BRIEF DESCRIPTION OF THE DRAWINGS

The disclosure may best be understood by referring to the following description and accompanying drawings that are used to illustrate embodiments of the disclosure. In the drawings.

DETAILED DESCRIPTION

Figure 1:
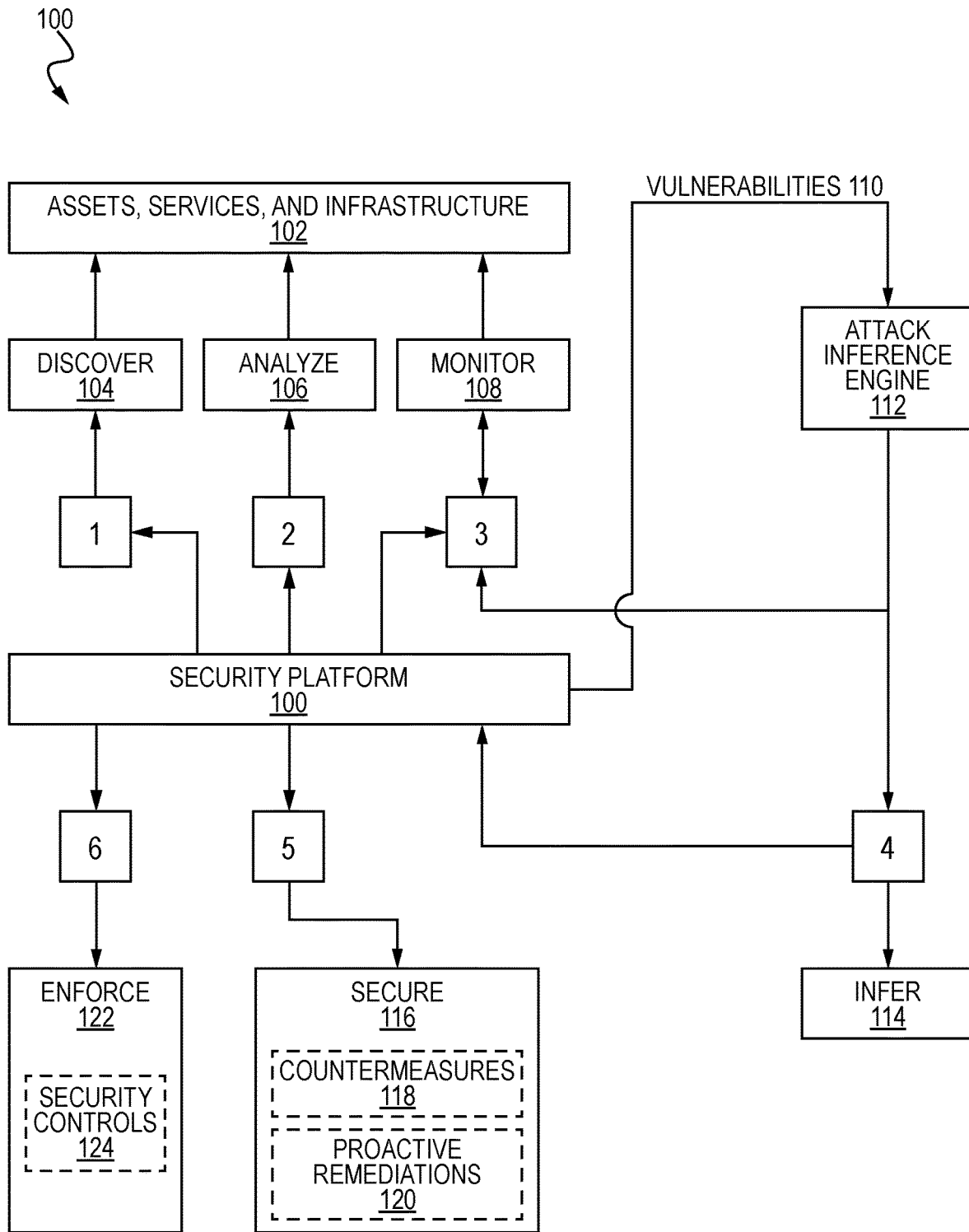
FIG. 1 is a block diagram of a security platform according to some embodiments.

The present disclosure relates to methods, apparatus, systems, and non-transitory computer-readable storage media for predictive analysis of potential attack patterns based on contextual security information. In certain enterprises and/or public cloud environments, there are several assets, applications, servers, services (e.g., software application stack(s)) which are connected through various networks. In turn, there could arise various vulnerabilities (e.g., including weaknesses and/or misconfigurations) related to these resources.

In certain embodiments, the information related to these aspects is retrieved from various asset management and security tools for correlating the data. In certain embodiments, the correlation provides the entire enterprise architecture, which helps identify the most critical security issues and components and helps prioritize correcting those issues. In certain embodiments, the security information and infrastructure information are used to predict potential attack paths (e.g., and patterns) that an attacker could employ to exploit the various security shortcomings. In certain embodiments herein, machine learning methods and algorithms are applied to predict potential attacks (e.g., attack paths) based on security knowledge and the communication channels between the entities. In certain embodiments herein, methods are also employed to propose remediation and mitigation actions to prevent the exploitation.

Detecting vulnerabilities (e.g., including weaknesses and/or misconfigurations) in an information technology (IT) environment is an effective way to stop cyberattacks before they manifest. Embodiments herein correlate security information with activity in a computing environment and use that to infer potential attack vectors. In certain embodiments, the attack vectors are correlated with the network architecture in an enterprise, and thus help infer potential attack paths. Embodiments herein are directed to a mechanism for correlating information about assets, applications, servers, and services discovered and their associated vulnerabilities (e.g., including weaknesses and misconfigurations) in a computing environment to predict attack paths and/or attack patterns. In certain embodiments, ongoing activity is analyzed to look for anomalies, suspicious events, and security alerts to detect attack activity. Certain embodiments herein provide remediation and mitigation actions to prevent exploitation based on the predictions made and ongoing activity. Certain embodiments herein calculate the risk associated with the assets and applications using the employed parameters to prioritize the assets and applications that are to be fixed, e.g., prioritized to be fixed. In certain embodiments, machine imaging methods are utilized to identify vulnerabilities in public cloud assets.

Certain embodiments herein perform operations including generating a profile for an enterprise that indicates one or more software application stacks and a network architecture for the one or more software application stacks; determining one or more vulnerabilities of the one or more software application stacks and one or more vulnerabilities of the network architecture; providing the one or more vulnerabilities of the one or more software application stacks, the one or more vulnerabilities of the network architecture, and the profile as input to a machine learning model; generating an inference by the machine learning model that indicates one or more attack paths for an attacker in the one or more software application stacks and the network architecture; and transmitting the inference to a storage location or a security software application. These embodiments are an improvement to the functioning of a computer network, namely, network security. The embodiments herein improve the ability to infer one or more attack paths in the software application stack(s) and network architecture for the software application stack(s) (e.g., of a business), with the improvement including using a specifically trained machine learning model to perform the inference on an input of (i) the one or more vulnerabilities of the one or more software application stacks, and (ii) the one or more vulnerabilities of the network architecture.

Certain embodiments herein perform operations including generating a profile for an enterprise that indicates one or more software application stacks and a network architecture for the one or more software application stacks; determining one or more vulnerabilities of the one or more software application stacks and one or more vulnerabilities of the network architecture; determining one or more anomalies within network traffic of the network architecture; providing the one or more vulnerabilities of the one or more software application stacks, the one or more vulnerabilities of the network architecture, the one or more anomalies within network traffic of the network architecture, and the profile as input to a machine learning model; generating an inference by the machine learning model that indicates one or more attack paths for an attacker in the one or more software application stacks and the network architecture; and transmitting the inference to a storage location or a security software application. These embodiments are an improvement to the functioning of a computer network, namely, network security. The embodiments herein improve the ability to infer one or more attack paths in the software application stack(s) and network architecture for the software application stack(s) (e.g., of a business), with the improvement including using a specifically trained machine learning model to perform the inference on an input of (i) the one or more vulnerabilities of the one or more software application stacks, (ii) the one or more vulnerabilities of the network architecture, and (iii) the one or more anomalies within network traffic of the network architecture.

In certain embodiments, the IT environment includes a plurality of applications (e.g., programs) (e.g., software) that each perform a specific task and typically run on an asset, for example, where an asset is a computer, virtual computer, computing device, servers, networking device, infrastructure device, security appliance, mobile device, or similar. In certain embodiments, the IT environment includes one or more business software applications, for example, a set of applications that help carry out a business task for an enterprise, e.g., billing, user management, etc. In certain embodiments, the IT environment includes a service (e.g., network service), e.g., a program running at the application layer of an Open Systems Interconnection (OSI) model that is listening on a certain port and provides certain functionalities such as data storage, data retrieval, presentation, communication, etc. Examples of services are a Hyper Text Transfer Protocol (HTTP) service (e.g., for communication between clients and web servers), Domain Name System (DNS) service (e.g., by which Internet domain names and addresses are tracked and regulated, e.g., as defined by Internet Engineering Task Force (IETF) Request for Comments (RFC) 1034 and/or other related RFCs), and Server Message Block (SMB) service (e.g., for providing file sharing, network browsing, printing, and inter-process communication (IPC) over a network).

In certain embodiments, a vulnerability is a security issue (e.g., in assets and/or applications) that can be exploited by a threat actor. In certain embodiments, a vulnerability includes a hardware and/or software error that can be exploited by a threat actor. In certain embodiments, a vulnerability includes a misconfiguration (e.g., a lack of security control(s) or error(s) when configuring the security controls for a server or service) that can be exploited by a threat actor. In certain embodiments, the security issue is the occurrence of a security event, e.g., that causes a security alert and/or security anomaly. Non-limiting examples of security events include a spike in network traffic, scanning activity, or a change in a security group that allows previously disallowed traffic. In certain embodiments, the assets and/or applications are grouped into tiers, e.g., where a tier is a collection of assets and/or applications that provide similar functionality and form part of the business application. For example, a web tier is a collection of web servers and the web services which provide web access functionality for a business application. In certain embodiments, the assets and/or applications includes one or more virtual machines (VMs), e.g., where a VM is a virtual or software-defined computer running within physical servers as code. In a public cloud environment, this may include VMs, instances, serverless functions, containers running in various settings under the public cloud environment, etc. In certain embodiments, the assets and/or applications includes a virtual cloud asset, e.g., where the virtual cloud asset is VM running in a public cloud environment (e.g., a cloud service provider that has a plurality of customers).

The below sections include (i) predictive analysis of potential attack paths based on contextual vulnerability information, (ii) methods for prioritizing security findings using machine learning models, (iii) risk scoring for applications based on historical, predictive, and inherent factors, (iv) methods for proposing counter measures for security vulnerabilities using contextual and attack prediction patterns, and (v) methods for vulnerability assessment for cloud assets using imaging methods.

(1) Predictive Analysis of Potential Attack Paths Based on Contextual Vulnerability Information Certain embodiments herein are directed to predictive analysis of potential attack paths based on contextual vulnerability information.

In certain embodiments of an enterprise and/or public cloud environment, information about the assets, applications, and services is retrieved from various asset management and security tools. In certain embodiments, network communications between the various entities are used to build a network architecture map. Additionally, services and applications might have vulnerabilities in that environment. In certain embodiments, the services and the communication channels could have misconfigurations. In certain embodiments, weaknesses are identified during the development stage by building the control and data flows in the application and identifying security issues in such flows. In certain embodiments, this information is used to predict potential attack patterns that an attacker could employ to exploit the weakness in the control and data flows. In certain embodiments, various methods and algorithms are applied to predict potential attack paths based on knowledge of communication channels between the entities.

FIG. 1 is a block diagram of a security platform 100 according to some embodiments. Depicted security platform 100 is to monitor the computing assets, services, and/or infrastructure 102 of an enterprise, e.g., an organization rather than individual users. Example organizations include businesses, schools, interest-based user groups, clubs, charities, governments, etc.

In certain embodiments, the (e.g., computer implemented) security platform 100 performs one or more of the disclosed operations to provide the functionalities described herein, e.g., in response to a request to perform security operations on the computing assets, services, and/or infrastructure 102.

In certain embodiments, security platform 100 is to perform a discovery at discover 104 (e.g., as shown by the square labeled with a "1") to determine the assets, services, and/or infrastructure 102 (e.g., one or more software application stacks and a network architecture of the one or more software application stacks). In certain embodiments, security platform is to perform an analysis at analyze 106 (e.g., as shown by the square labeled with a "2") to correlate the discovered information from 104 and/or identify one or more business applications. For example, by using the routing, asset tags, access control lists, control flows, data flows, and/or business flows, the business application is identified. In certain embodiments, security platform 100 is to perform continuous monitoring at monitor 108 (e.g., as shown by the square labeled with a "3") to determine any changes to the assets, services, and/or infrastructure 102 (e.g., any changes to the one or more software application stacks and a network architecture of the one or more software application stacks). In certain embodiments, security platform 100 is to generate one or more indication of vulnerabilities 110 in assets, services, and/or infrastructure 102, e.g., generated from the discover 104, analyze 106, and monitor 108. In certain embodiments, security platform 100 (e.g., attack inference engine 110 thereof) is to perform an inference at infer 114 (e.g., as shown by the square labeled with a "4") to determine potential attack path(s), risk score(s), and/or compliance status(es). In certain embodiments, security platform 100 is to determine one or more security solutions to the attack path(s) at secure 116 (e.g., as shown by the square labeled with a "5") (e.g., to determine countermeasure(s) 118 and/or practice remediation(s) 120). In certain embodiments, security platform 100 is to enforce (e.g., a proper subset of) at enforce 122 (e.g., as shown by the square labeled with a "6") the one or more security solutions, e.g., via modification of security control(s) 124, e.g., patching the systems.

In certain embodiments, during the "discover" 104 phase, information about the various assets, services, infrastructure details (e.g., network name, network zone, subnets, etc.) is collected. In certain embodiments, this is done by connecting to the application programing interface (API) of various tools. In certain embodiments, the information indicated the attributes of an asset such as operating system (OS) information, Internet Protocol (IP) address, network zone, and/or region. In certain embodiments, the information related to the network connections of the asset is obtained as part of this process. In certain embodiments, such information of the network connections is later employed to identify one or more business applications (e.g., software stack). In certain embodiments, information related to the deployed software in those assets is obtained as well. This is used to classify the asset as belonging to a certain network type in certain embodiments. In certain embodiments, the types of network assets (e.g., the network architecture) includes a firewall, load balancer, web application endpoint, database (DB) endpoint, etc. In certain embodiments, the information retrieved is related to the vulnerabilities (e.g., including weaknesses and/or misconfigurations) in the various assets or in the services running on those assets.

In certain embodiments, during the "analyze" 106 phase, the collected information is correlated (e.g., and the business application(s) are identified). In certain embodiments, the correlation is based on certain features associated with the assets or tags provided by the consumer of the product. Example of features are the services port numbers, the type of network connections made to other assets, the network zone of the asset, the software running on the asset, and/or access controls related to the asset. In certain embodiments, for tags, the consumer is provided the ability to tag certain assets to belong to a business application. In certain embodiments, the network architecture of the business application is analyzed by gathering the asset data and analyzing the interaction between the various assets. In certain embodiments, one or more machine learning models are employed to discover the network architecture of the business application, e.g., as discussed below.

In certain embodiments, the "monitor" 108 phase is similar to the "discover" 104 phase but is done continually. In certain embodiments, the frequency of information gathering is based on the type of tool. For example, the asset data might be gathered every 24 hours in certain embodiments. In certain embodiments, static scans and vulnerability scans are scheduled (e.g., by a consumer) (e.g., every week), and the frequency is scheduled as per the tool setup. In certain embodiments, tools such as firewalls and intrusion detection systems provide logs more frequently, and hence this information is collected at more frequent intervals. In certain embodiments, in addition, periodically the configurations of the various tools are checked to adjust the frequency of scans accordingly. In certain embodiments, the consumer (e.g., of the security platform 100) provides access to network traffic or network traffic metrics of their environment, e.g., such that the frequency is about every minute or about every 5 minutes. In certain embodiments, the access provided depends on the environment where the assets are deployed. Examples of network traffic access is through a switched port analyzer (SPAN) port, test access port (TAP) port, and/or traffic mirroring. Examples of network traffic metrics are virtual private cloud (VPC) flow logs, metrics from security information and event management (SIEM) tools, and/or reports from other cybersecurity tools. In certain embodiments, certain anomalies are detected by the security system which can be used to suggest ad-hoc monitoring to be triggered.

In certain embodiments, during the "infer" 114 phase, all the collected information (e.g., collected by vulnerability detectors 500 in FIG. 5) is analyzed. In the depicted embodiment, the attack inference engine 112 performs the inference(s). In certain embodiments, the collected information includes vulnerabilities (e.g., and weaknesses and/or misconfigurations) information. In certain embodiments, the collected information (e.g., vulnerabilities information) that was discovered is mapped to the assets, services, and/or applications in a business application. In certain embodiments, a network architecture map previously discovered is employed to infer potential attack paths. In certain embodiments, one or more machine learning models are employed to predict the next attack sequence in an attack pattern (e.g., as discussed below). In certain embodiments, this contextual information is used to calculate risk scores (e.g., between 1 and 10, or a corresponding percentage), for example, for assets and business applications. In certain embodiments, the compliance status (e.g., a binary "yes" for compliance or binary "no" for non-compliance) of assets is analyzed and presented (for example, to a user of the security platform 102, e.g., an IT administrator).

In certain embodiments, the "secure" 118 phase uses the attack paths and exploitability information to proactively propose countermeasures and/or remediations. In certain embodiments, these measures, if implemented, are to prevent/mitigate potential attack scenarios. In certain embodiments, the vulnerability (e.g., and weakness/misconfiguration) information is mapped to standard weakness (e.g., and/or vulnerability) identifiers such as CWE (Common Weakness Enumeration) and CVE (Common Vulnerability Enumeration). In certain embodiments, these standard identifiers provide suggested remediations, which are mapped by the security platform 100 based on the network architecture and relevant specifics are added to the remediations. For example, for a "Blind SQL injection" weakness, a standard remediation is to introduce input validation in the software service in certain embodiments. However, implementing this remediation involves the development cycle for the software, which would require time. Instead, if the security platform 100 has determined that a web application firewall (WAF) is part of the network architecture, the remediation proposed is to have a rule that could be implemented through the WAF tool to prevent exploitation while the permanent fix is being developed and tested.

In certain embodiments, the countermeasures 118 and/or remediations 120 are enforced through the various security controls 124 and/or tools existing in a particular environment. These could range from firewall rules, access control list (ACL) rules, WAF rules, and/or intrusion prevention system (IPS) signatures. As in the previous example, where a WAF rule is proposed to prevent a SQL injection attack, in certain embodiments herein the consumer is provided the option by the security platform 100 to apply the rule. In certain embodiments, the rule is created and applied through the API interaction of the security platform 100 and the WAF tool. e.g., with this reducing one additional step for consumers to separately access the WAF in order to enforce the rule.

Figure 2:
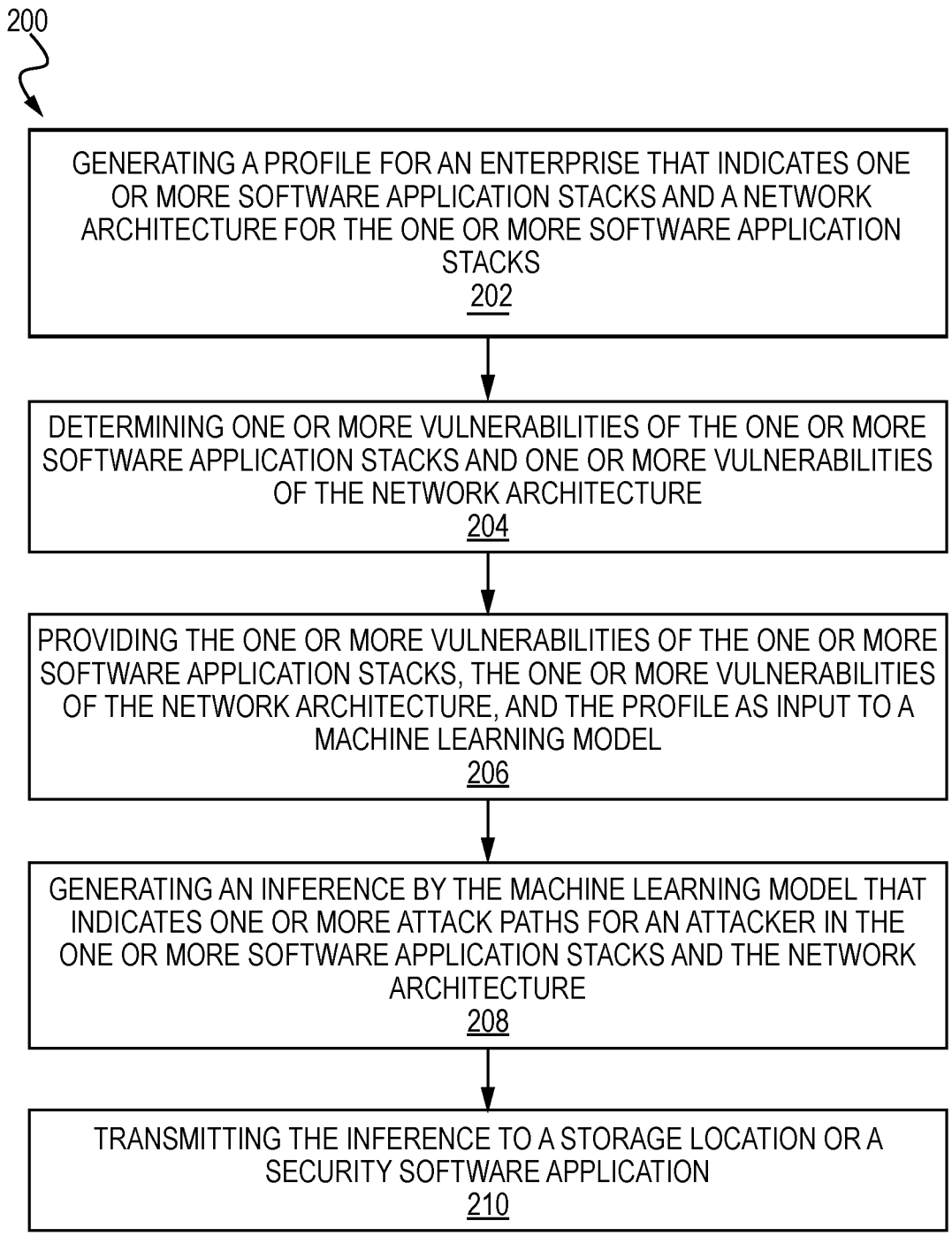
FIG. 2 is a flow diagram illustrating operations of a method for predictive analysis of potential attack patterns based on contextual security information according to some embodiments.

FIG. 2 is a flow diagram illustrating operations 200 of a method for predictive analysis of potential attack patterns based on contextual security information according to some embodiments. Some or all of the operations 200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 200 are performed by security platform (or a component thereof) of the other figures.

The operations 200 include, at block 202, generating a profile for an enterprise that indicates one or more software application stacks and a network architecture for the one or more software application stacks. The operations 200 further include, at block 204, determining one or more vulnerabilities of the one or more software application stacks and one or more vulnerabilities of the network architecture. The operations 200 further include, at block 206, providing the one or more vulnerabilities of the one or more software application stacks, the one or more vulnerabilities of the network architecture, and the profile as input to a machine learning model. The operations 200 further include, at block 208, generating an inference by the machine learning model that indicates one or more attack paths for an attacker in the one or more software application stacks and the network architecture. The operations 200 further include, at block 210, transmitting the inference to a storage location or a security software application.

Business Application Discovery

In certain embodiments, the first operation to analyze the security posture of an enterprise is to obtain information about the various business applications running in the environment. The application could be deployed across several assets spread across various IT environments and/or servers and could include several services that together achieve the business functionality. Thus, this provides insights into the criticality of the business applications and in turn helps prioritize security assessments and remediations. In certain embodiments, the network connectivity between the various components of the application helps predict the attack path(s). In certain embodiments, risk score calculations including, but not limited to, various factors such as deployment mode, impact on confidentiality, integrity, and availability for the business application, prediction of attack and lateral movement across the application, interaction with other application(s) helps a security officer make critical security decisions that they could not make in their head or with just pen and paper. In certain embodiments, a critical step in business application discovery is to correlate the data obtained from a plurality of sources. An example process for business application discovery is discussed below in reference to FIG. 3 and an example of a discovered business application is discussed below in reference to FIG. 4.

Figure 3:
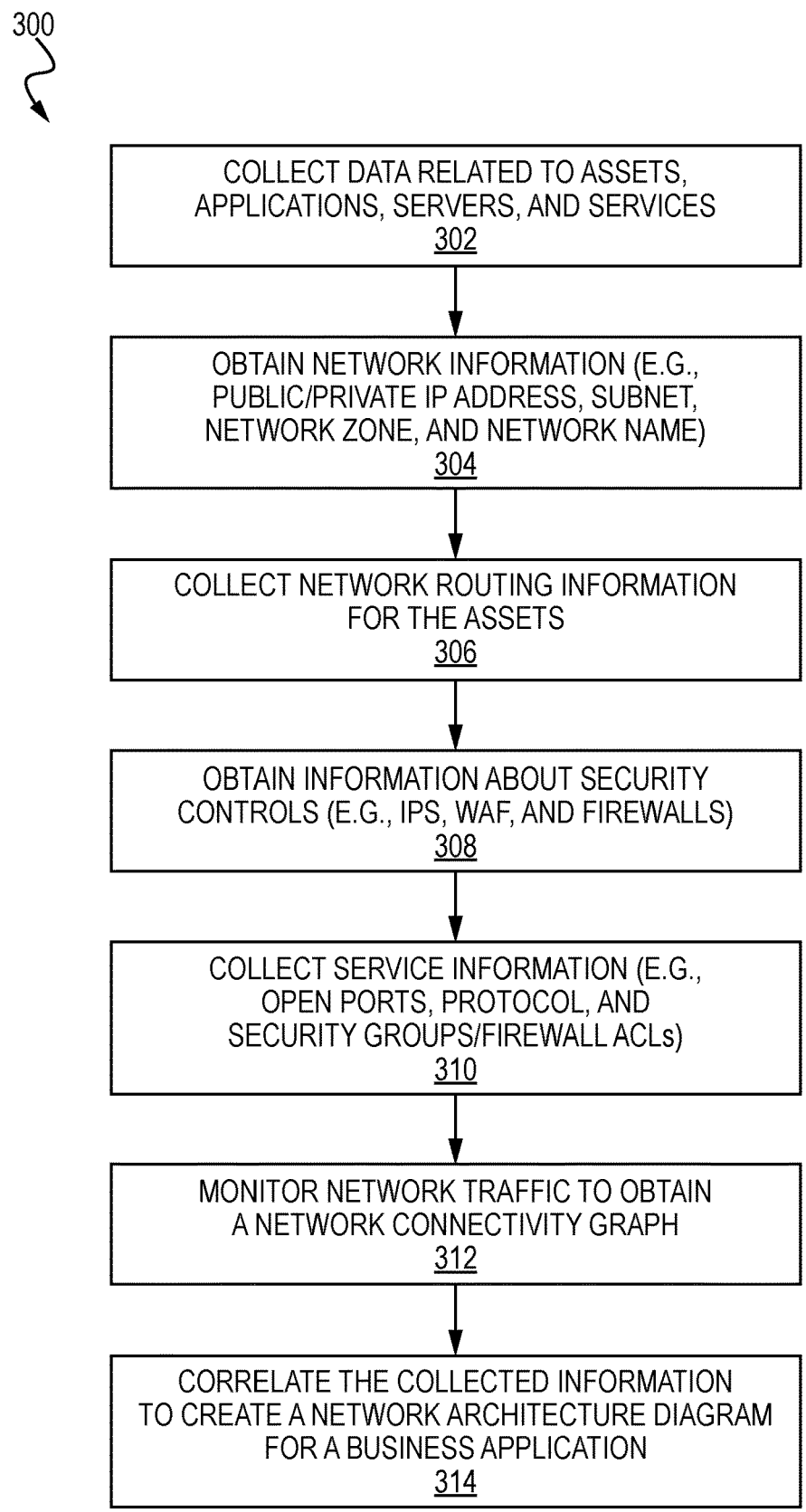
FIG. 3 is a flow diagram illustrating operations of a method for discovering one or more business application according to some embodiments.

FIG. 3 is a flow diagram illustrating operations 300 of a method for discovering one or more business application according to some embodiments. Some or all of the operations 300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by security platform (or a component thereof) of the other figures.

The operations 300 include, at block 302, collecting data related to assets, applications, servers, and services. The operations 300 further include, at block 304, obtaining network information (e.g., public/private IP address, subnet, network zone, and/or network name). The operations 300 further include, at block 306, collecting network routing information for the assets. The operations 300 further include, at block 308, obtaining information about security controls (e.g., IPS, WAF, and/or firewall(s)). The operations 300 further include, at block 310, collecting service information (e.g., open ports, protocol, and/or security groups/firewall ACLs). The operations 300 further include, at block 312, monitoring network traffic to obtain a network connectivity graph. The operations 300 further include, at block 314, correlating the collected information to create a network architecture diagram for the business application(s).

In certain embodiments, business application discovery operations include one or more of the following. In certain embodiments, the data related to assets is retrieved from tools and sources existing in a computing environment. In certain embodiments, the related network information (e.g., data center, network zone, network name, subnet, and/or public/private IP addresses) associated with the assets is retrieved as well. In certain embodiments, tools such as configuration management database (CMDB), public cloud APIs, and/or cloud security posture management (CSPM) are used for this purpose. In certain embodiments, this information is retrieved through the APIs of these tools, databases provided by these tools, or in some cases files storing data from these tools. In certain embodiments, the routing information is obtained for these assets which is used to build the routing structure between the assets. In certain embodiments, information such as security groups and/or firewall ACLs is used to build the connectivity information between the various assets. In certain embodiments, tools such as public cloud APIs, firewall logs, ACL logs, and/or router data is used to build this information.

In certain embodiments, if security control (e.g., IPS, WAF, and/or firewall) information is present in the environment, the related information such as network zone and/or network name is retrieved from the tools. In certain embodiments, this information is collected through logging tools such as SIEM tools, IT tools (e.g., CMDB), or using public cloud APIs.

In certain embodiments, information about the network services such as the ports listening on, the protocol used, and/or the software that the service is using, is obtained from vulnerability detectors (e.g., vulnerability scanners). In certain embodiments, for public cloud assets, the security platform uses the imaging method discussed below to obtain the service information. In certain embodiments, the imaging method can also help retrieve information about any containers and container services. In certain embodiments, in the case of deployment using a container-orchestration system (e.g., Kubernetes), container service information is obtained by using the APIs.

In certain embodiments, using the service information and the ports they are listening on, assets are grouped into tiers. Further, the corresponding software information could be used to classify the asset and service belonging to a layer of the business application. For example, all web servers listening on certain ports (e.g., ports 80, 8080, and 443) could be grouped into a web tier/presentation layer. For example, port 5432 representing a database could belong to database tier/database layer. Similarly, all business logic services could be grouped into the application tier/business layer. The business application layer thus corresponds to the layered architecture software design employed by entities to handle various business needs in certain embodiments.

In certain embodiments, a business application is thus made of various tiers/layers comprising of apps, assets, services, and software stacks. In addition, there could be certain common services such as DNS, NTP etc., which are essential for the functioning of the business application. Such services could be categorized under the common tier/layer.

In certain embodiments, a private cloud (e.g., private data center) resides on a company's own infrastructure, for example, firewall protected and physically secured such there is no sharing of infrastructure, no multitenancy issues, and/or zero latency for local applications and users. In certain embodiments, a public cloud alleviates the responsibility for management of the infrastructure since it is by definition hosted by a public cloud provider, for example, in and infrastructure-as-a-service (IaaS) public cloud deployment, enterprise data and application code reside on the cloud service provider (CSP) servers, which can be shared in a multi-tenant environment with other organizations' IT resources.

In certain embodiments, the business application(s) are classified based on the code base they reside at. For example, all the functionalities of a business application might be in a single folder (e.g., Git repository) of a distributed version control system. However, the deployment of the applications might be spread across various assets, network zones, environments (such as public cloud, private cloud, and/or on-premises (on-prem)) and geographies. In certain embodiments, business application information is retrieved using code repositories and/or by using certain tools (e.g., secure code analysis tool (SAST)) which work on code repositories.

Figure 4:
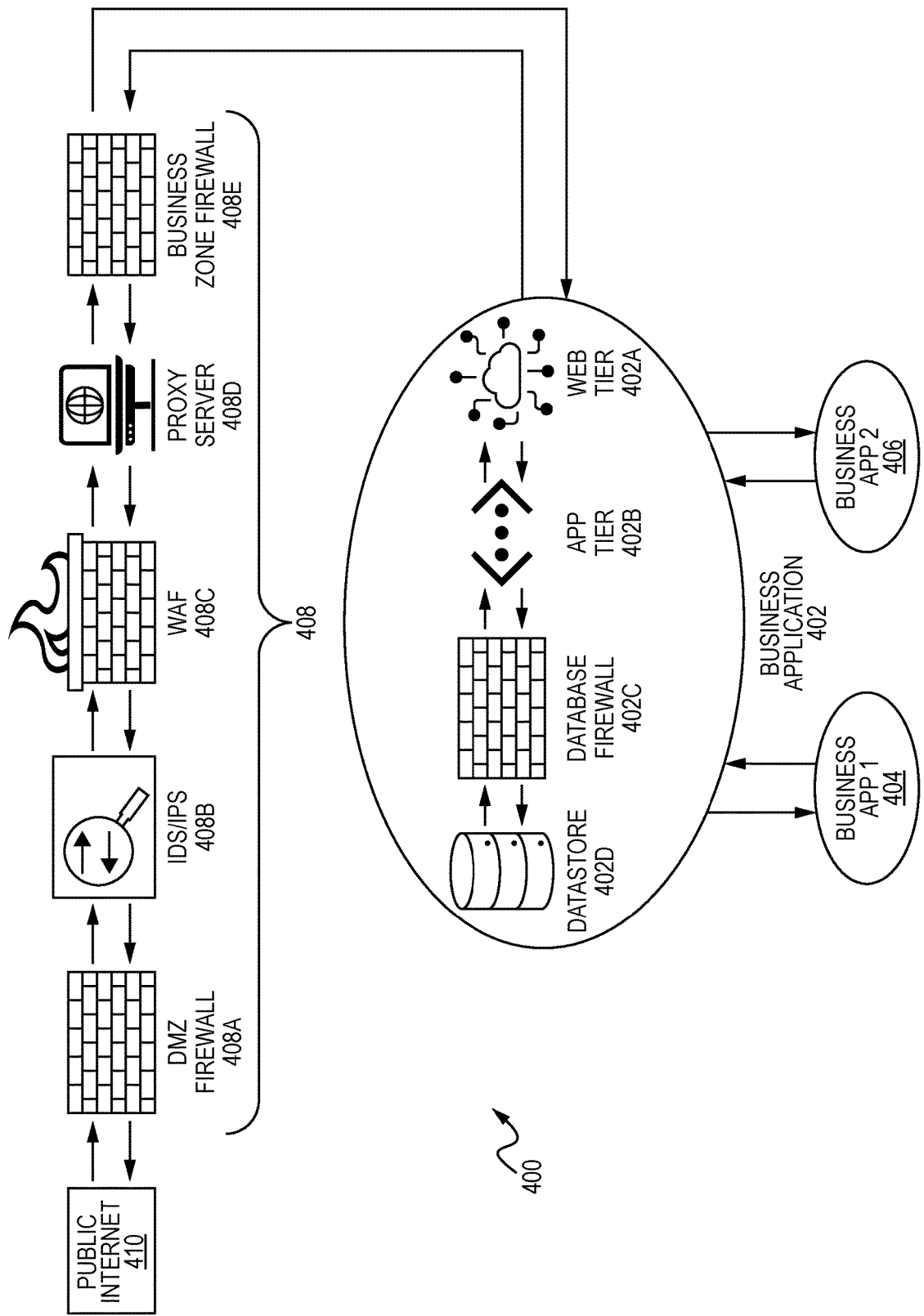
FIG. 4 is a block diagram illustrating a network architecture having a plurality of business applications according to some embodiments.

In certain embodiments, this data (e.g., including network activity) is used to generate a network architecture of the business application, for example, as shown in business application 402 in FIG. 4. In certain embodiments, the network activity is obtained either through network taps in an on-prem environment, or through flow logs in public cloud environments. In certain embodiments, the information provided by these sources includes source IP address, destination IP address, source port, destination port, and/or if connections were allowed or blocked. In certain embodiments, this data is used to further build network connectivity between the assets in a business application and between various business apps.

In certain embodiments, using the various information gathered at several levels, such as about the assets, apps, services and the network interactions, a model for the network architecture of a business application is built, e.g., as shown graphically in FIG. 4.

FIG. 4 is a block diagram illustrating a network architecture 400 having a plurality of business applications according to some embodiments. In certain embodiments, security platform 100 is to generate a graphical user interface (GUI) illustrating the network architecture 400. In certain embodiments, the network architecture 400 indicates a business application 402, e.g., a business application having a web tier 402A, an application tier 402B, a firewall 402C, and a database 402D (e.g., of the one or more software application stacks forming the business application 402). In certain embodiments, the network architecture 400 indicates one or more additional business applications 404 and/or 406, for example, that perform service(s) for the business application 402.

In certain embodiments, the network architecture 400 indicates the components 408 coupling the business application(s) (e.g., business application 402) to the public internet 410. In certain embodiments, the components 408 include one or more of a (e.g., "DMZ") firewall 408A (e.g., between a public network (e.g., internet 410) and private network (e.g., 408, 402, 404, and 406), an intrusion detection system (IDS) and/or intrusion prevention system (IPS) 408B, a web application firewall (WAF) 408C, a proxy server 408D (e.g., to relay Hypertext Transfer Protocol (HTTP) requests to business application(s) protected by a firewall, and a business zone firewall 408E.

In certain embodiments, a particular network architecture is assigned to a profile for a particular set of assets, services, and/or infrastructure 102 in FIG. 1.

Attack Path Prediction

Certain embodiments herein utilize the determined network architecture along with one or more identified vulnerabilities to infer a potential attack, e.g., instead of merely presenting each vulnerability for a decision to be made on, which is not practically performed by a human being.

In certain embodiments, after determining, the next step to securing an enterprise is to determine and predict the impacts of attacks and/or the potential paths an attack could (e.g., laterally) move in the context of a business application. This helps not only to understand the criticality of assets and applications in an enterprise but also identifies the attack blind spots in a networked architecture.

Figure 5:
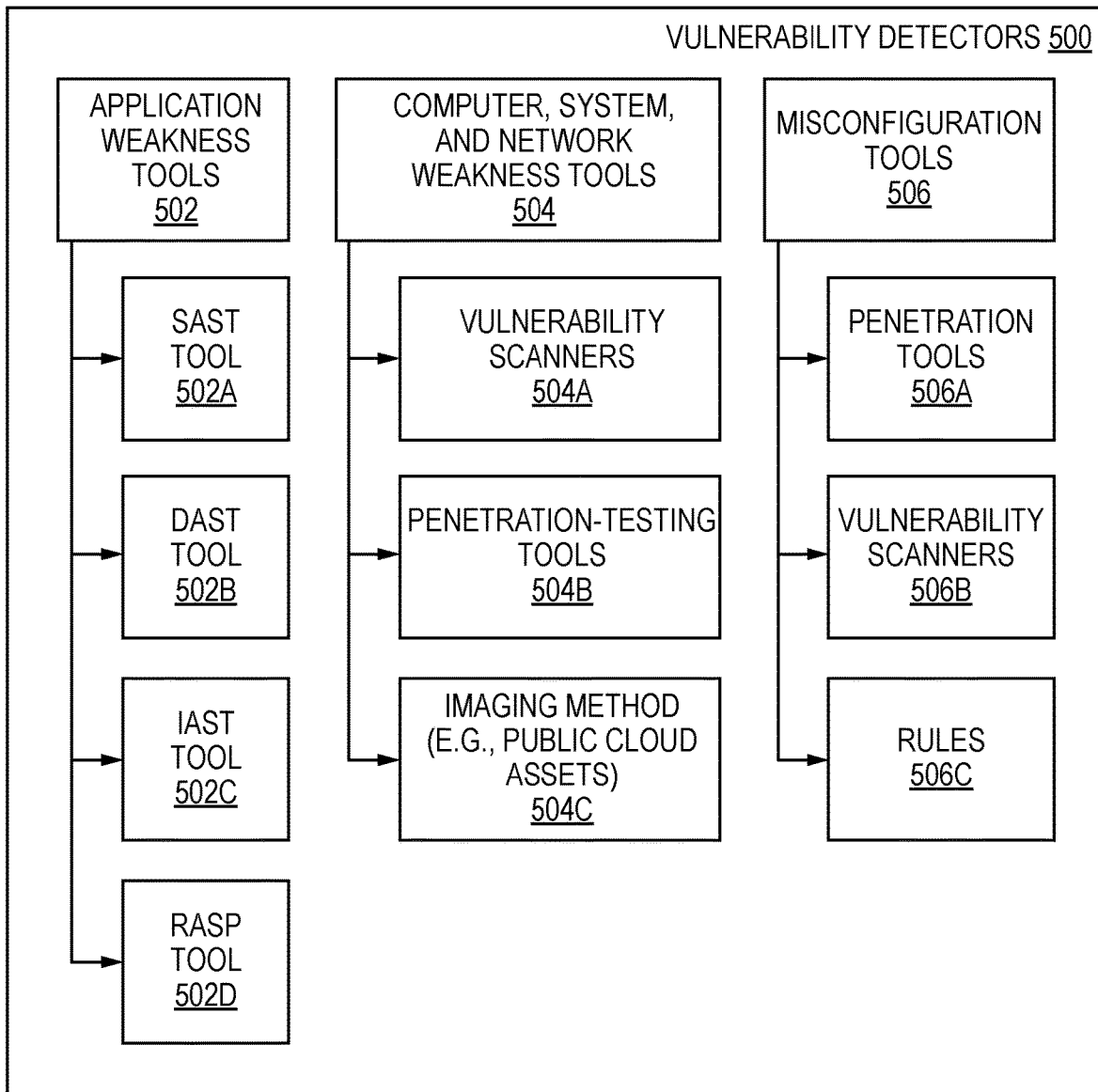
FIG. 5 is a block diagram illustrating vulnerability detectors according to some embodiments.

In certain embodiments, given the various components of the business application, there can be vulnerabilities (e.g., buffer overflows), along with weaknesses (e.g., unencrypted passwords) and/or misconfigurations (e.g., using a default administrator password) in the various assets, applications, and services. Identifying security issues is crucial to identify, predict, and prevent an attack from taking place. In certain embodiments, this "security issues" information is derived from various sources such as the vulnerability detectors 500 (e.g., static scanners, dynamic scanners, pen testing tools, etc.) as shown in FIG. 5. In certain embodiments, the security platform is to take the security information (e.g., vulnerabilities, weaknesses) and correlate it to the network architecture to analyze the potential ways the issues could be manifested. Example operations to identify and predict security issues and propose remediations are outlined in FIG. 6.

Collecting Security Data: Several tools such as scanners, vulnerability management, software composition analysis and penetration test tools, are used to scan a particular network or use agents to provide information about the services running on servers, the software packages associated with the services and the vulnerabilities associated with the service in certain embodiments. For example, server code (e.g., a certain version number) is running on port 80 and 443 and is subject to three vulnerabilities. In certain embodiments, such information is collected and further analyzed and associated with asset information to understand the criticality and impact of the vulnerabilities on the assets in an enterprise. In certain embodiments, these tools can also use various analysis techniques to report about misconfigurations such as missing authentication checks, weak passwords, anonymous logins allowed, etc. In certain embodiments, external vulnerability sources such as National Vulnerability Database, security forums, and vendor advisories could be used to enhance the security information.

In certain embodiments, tools such as secure code analysis tools (SAST), dynamic code analysis tools (DAST), and interactive application security testing (IAST) tools either scan the code or use agents deployed on endpoints running the code to report any weakness information. Such tools can be used to retrieve weakness information associated with applications.

FIG. 5 is a block diagram illustrating vulnerability detectors 500 according to some embodiments. Depicted vulnerability detectors 500 includes application weakness tools 502, computer, system, and network weakness tools 504, and misconfiguration tools 506 to detect those corresponding issues. In certain embodiments, application weakness tools 502 includes one or more of: secure code analysis tool (SAST) 502A, dynamic code analysis tool (DAST) 502B, interactive application security testing (IAST) tool 502C, or run-time application security protection (RASP) tool 502D. In certain embodiments, computer, system, and network weakness tools 504 includes one or more of: vulnerability scanner(s) 504A, penetration testing tool 504B, or imaging method 504C (e.g., on public cloud assets). In certain embodiments, misconfiguration tools 506 includes one or more of: penetration testing tools 506A, vulnerability scanners 506B, or rules 506C.

Figure 6:
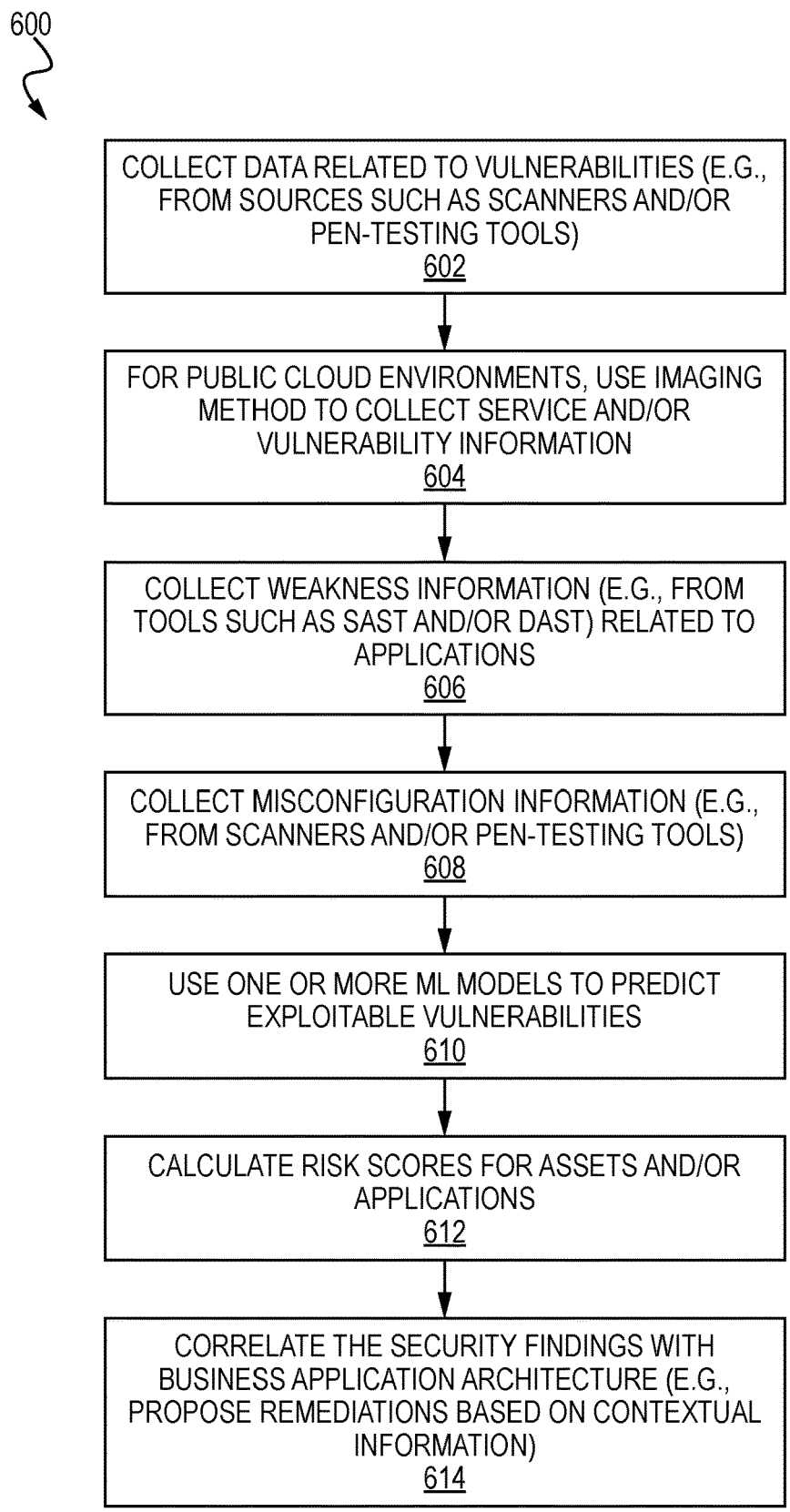
FIG. 6 is a flow diagram illustrating operations of a method for identifying and predicting security issues and proposing remediations according to some embodiments.

FIG. 6 is a flow diagram illustrating operations 600 of a method for identifying and predicting security issues and proposing remediations according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by security platform (or a component thereof) of the other figures.

The operations 600 include, at block 602, collecting data related to vulnerabilities from the sources (e.g., from vulnerability detectors 500) (e.g., vulnerabilities 110 in FIG. 1) such as, but not limited to scanners and/or pen-testing tools. The operations 600 further include, at block 604, for public cloud environments, using a machine imaging method to collect service and vulnerability information (e.g., as discussed below). The operations 600 further include, at block 606, collecting weakness information (e.g., from tools such as SAST and/or DAST) related to applications. The operations 600 further include, at block 608, collecting misconfiguration information (e.g., from scanners and/or pen-testing tools). The operations 600 further include, at block 610, using one or more machine learning models to predict exploitable vulnerabilities (e.g., and weaknesses and/or software misconfigurations). The operations 600 further include, at block 612, calculating risk scores for assets and/or applications. The operations 600 further include, at block 614, correlating the security findings with business application architecture, e.g., and proposing remediations based on contextual information.

Exploit Prediction and Risk Scoring: Currently there are thousands of vulnerabilities as reported by the National Vulnerability Database and hundreds of weaknesses as per Common Weakness Enumeration, and likely many more which are undocumented. In certain enterprises, there are applications (e.g., which use various technologies) running software with varied versions, and each of those may (or do) have numerous vulnerabilities. Embodiments herein calculate an "Exploitability Prediction Rating" (EPR), which provides a rating related to the exploitability of a vulnerability (e.g., and a weakness and/or a misconfiguration) and/or the exploitability of a particular technology/software. In certain embodiments, a machine learning model is trained and used to interpolate the prediction rating, for example, a machine learning (ML) model including, but not limited to, classification, clustering, and forecast models. An algorithm such as Gradient Boosted Model, Random Forest, K-Means, or Bayesian Model is used for the learning in certain embodiments.

In certain embodiments, the process of training an ML model involves providing training data to an ML algorithm, e.g., with the training data including data and features related to the prediction to be achieved. In certain embodiments, the output of the ML model then captures the patterns needed to predict and provide answers.

In certain embodiments herein (e.g., for an attack inference engine 112), a machine learning model is to predict (i) the exploitability of a vulnerability (e.g., and/or a weakness and/or a misconfiguration), and/or (ii) the exploitability of software (e.g., and its version), for example, even when the software has no current vulnerabilities associated with it. In certain embodiments, the training data includes one or any combination of the following features related to vulnerabilities (e.g., and weaknesses and/or misconfigurations) and software: identifier for the vulnerability/weakness, identifier for the software along with its version, number of references to the vulnerability, number of software and versions affected by vulnerability, number of exploits available for vulnerability, number of advisories published for vulnerability, time between exploit availability and disclosure of vulnerability, availability of a fix for a vulnerability, type of fixes available (e.g., patch and/or workaround), time between disclosure/exploit availability and fix provided, time since fix was available, popularity of the software affected (e.g., based on percentage of exploits existing or number of instances of software in a particular environment), percentage of vulnerabilities associated with the software, standard severity rating of the vulnerability, references indicating if vulnerability is widely exploited, type of service/application affected (e.g., web application, database application, security application, etc.), general impact in case of exploitation, ease of exploitation, and/or number of vulnerability identifiers associated with a weakness.

In certain embodiments, a machine learning model (e.g., trained using the above) is then utilized on an enterprise (e.g., a profile identifying that enterprise and/or their assets, services, and/or infrastructure) and the output of the model is one or more predictions about exploitability of a vulnerability and/or exploitability of the assets, services, and/or infrastructure (e.g., assets, services, and infrastructure 102 in FIG. 1) of the user, e.g., even when there is no current vulnerability. In certain embodiments, the exploitability of the assets, services, and/or infrastructure is a prediction that indicates if those assets, services, and/or infrastructure (e.g., software) are exploitable even if there is not current vulnerability associated with them (e.g., it), e.g., predicting development of 0-day exploits.

In certain embodiments, a machine learning model determines the exploitability of a vulnerability of the assets, services, and/or infrastructure (e.g., software) regardless of their (e.g., its) placement in an enterprise.

In certain embodiments, a security platform has collected data related to assets and/or business applications, and thus the EPR rating(s) are correlated with the contextual information to predict the assets and/or business applications that are most exploitable. In certain embodiments, the asset and/or business application risk scores are determined using factors related to the resources themselves in addition to the vulnerability and/or software EPR.

In certain embodiments, the factors used for calculating asset and/or business application risk scores includes one or any combination of the following: type of exposure of asset and/or business application (e.g., public or private), type of service(s) associated with the asset and/or business application (e.g., web, database, networking, security, name resolution, etc.), criticality of asset and/or business application (e.g., is it used in production/development), type of asset (e.g., computer, virtual machine, router, security device, etc.), existence of security controls (e.g., WAF, IPS, firewall, vulnerability management, etc.), the number of other business applications connected to it (e.g., discovered using business apps network architecture), and/or the number of connections to other datacenter(s) of the enterprise.

In certain embodiments, assets and business applications have several vulnerabilities associated with them, for example, and the corresponding risk score is a function of the EPR scores of all vulnerabilities, EPR scores of software running on the asset or used in the business application, severity scores of misconfigurations, and/or the above defined factors. In certain embodiments, the scores thus calculated are used to prioritize the assets and/or business applications that are (e.g., prioritized) to be remediated of security issues.

Identifying Attack Patterns: in certain embodiments, the prediction(s) about exploitability of a vulnerability and/or exploitability of the assets, services, and/or infrastructure (e.g., assets, services, and infrastructure 102 in FIG. 1) is used to identify one or more attack patterns and/or attack paths for an attacker (e.g., "hacker") in those assets, services, and/or infrastructure.

Certain embodiments herein use the network connectivity (e.g., network architecture 400 in FIG. 4) of a business application within (e.g., and to other business apps), to identify (e.g., predict) attack patterns. In certain embodiments, the predicted attack patterns are used to (e.g., visually) depict the potential paths and/or lateral spread in case of a potential exploitation. In certain embodiments, this helps an enterprise secure its assets, services, and/or infrastructure (e.g., its assets and applications) in the propagation path.

As one example, a business application (e.g., software application stack) includes a web tier, an app tier, and a database tier, e.g., where each tier involves several assets and corresponding applications (e.g., as discussed in reference to business application discovery herein). In certain embodiments, the highest risk vulnerabilities and software in the business application are identified, e.g., by attack inference engine.

In certain embodiments, the network activity in the environment is correlated with the security issues in the various components, e.g., to provide insight into any ongoing cyber-attacks.

In certain embodiments, a score (e.g., EPR score) for a potential risk of exploitation for each of the components (e.g., assets and business applications) is determined (e.g., calculated). In certain embodiments, a risk score serves as an indicator of the exploitability of a particular business application (or the whole computing environment), e.g., such that this knowledge would help a security officer and/or security platform to prioritize the mitigating or fixing of the issue(s).

Figure 7:
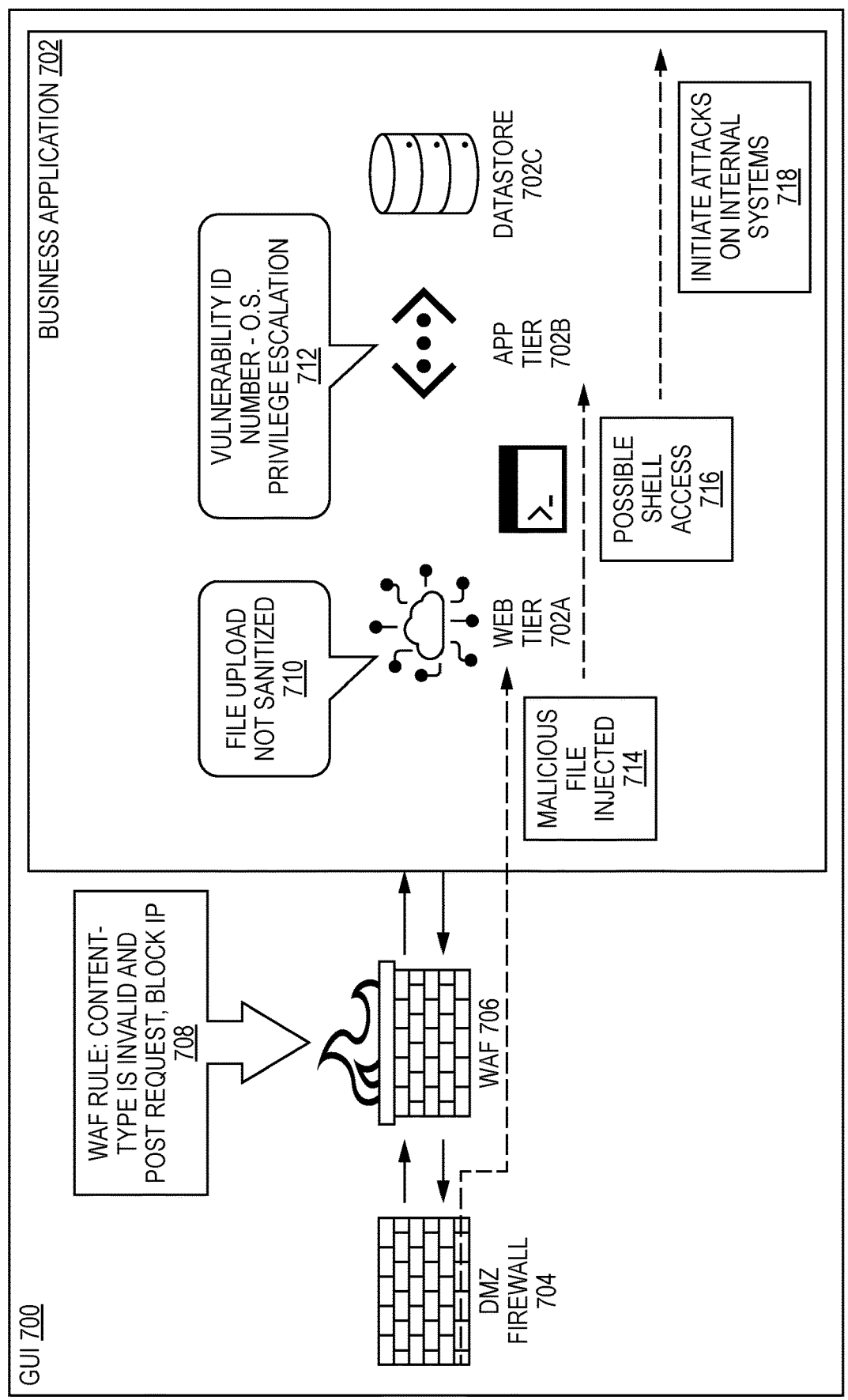
FIG. 7 is a diagram illustrating a graphical user interface for indicating one or more attack paths with a corresponding indication of a corresponding remediation for each attack path and a corresponding vulnerability for each attack path according to some embodiments.

In certain embodiments, a human (e.g., security officer) has difficulty correlating the vulnerabilities with the assets, services, and/or infrastructure, e.g., as this is not practicably performed with the mind or pen and paper. Certain embodiments herein thus provide a graphical user interface (GUI) for indicating one or more attack paths and/or a corresponding indication of a corresponding remediation for each attack path and a corresponding vulnerability for each attack path. In certain embodiments, based on the weaknesses, potential mitigations are determined, e.g., and if mitigations already exist, the inference about potential attack paths and risk scores is adjusted and depicted accordingly (e.g., in the GUI). FIG. 7 depicts examples of potential attack paths.

FIG. 7 is a diagram illustrating a graphical user interface (GUI) 700 for indicating one or more attack vectors (710 and 712) with a corresponding indication (714, 716, and 718) of the impact of the potential attack, and a corresponding remediation for the attack path (e.g., 708). The vulnerability prioritization and the impact of those vulnerabilities are utilized to prioritize the most critical and high impact attack paths according to some embodiments. Although shown on a single GUI 700, in other embodiments, a first GUI can be used to indicate an attack path (e.g., and the underlying vulnerability or vulnerabilities) and a separate second GUI to indicate remediation(s) and the impact of applying the remediations.

In certain embodiments, a security platform (e.g., security platform 100) generates an inference of one or more attack paths. The inferences might indicate a potential high risk attack, a high risk impact on confidentiality, a high risk of potential data extraction, a high risk of lateral spread of an attack, remediation that could hinder the attack. For example, in FIG. 7, the network architecture of a (e.g., "DMZ") firewall 704 and a web application firewall (WAF) 706 connect business application 702 (e.g., to the public internet). In the depicted embodiment, the security platform (e.g., security platform 100) has determined that business application 702 includes a web tier 702A, coupled to an application tier 702B, that is coupled to a datastore (e.g., database) 702C, and has inferred (e.g., via attack inference engine 112) that a possible attack path exists at 714 for the injection of a malicious file (e.g., past firewall 704 and firewall 706), that a possible attack path exists at 716 for a possible shell access 716, and a possible attack path exists at 718 for initiating attack(s) on internal systems 718 (e.g., on datastore 702C and potential data extraction from the datastore). In the depicted embodiment, the security platform (e.g., security platform 100) has inferred (e.g., via attack inference engine 112) that a possible remediation for the attack path at 714 is to generate a WAF rule at 708 (e.g., "content type is invalid and post request, block IP" of sender), a possible remediation for the attack path at 716 is to sanitize the file upload at 710, and a possible remediation for the attack path at 718 is to fix the vulnerability (e.g., also listing the vulnerability identification (ID) number) and block an OS privilege escalation.

In certain embodiments, one or any combination of these remediations are displayed in the GUI 700, e.g., indicating the remediation status (e.g., complete) and/or requesting permission to perform the remediation (e.g., from a user).

Real-time Security Event Input: In certain embodiments, real-time security event (e.g., a detected anomaly) input is utilized (e.g., with the prediction(s) about exploitability of a vulnerability and/or exploitability of the assets, services, and/or infrastructure (e.g., assets, services, and infrastructure 102 in FIG. 1)) to identify one or more attack patterns and/or attack paths for an attacker (e.g., "hacker") in those assets, services, and/or infrastructure. In certain embodiments, the security platform (e.g., security platform 100) determines one or more anomalies within network traffic of the network architecture.

In certain embodiments (e.g., in addition to the vulnerability, weakness, and misconfiguration security findings), the real-time traffic is a source of various events such as security alerts, anomalies, and events. In certain embodiments, security alerts include alerts reported by various security tools (e.g., an Intrusion Prevention System). In certain embodiments, events are reported by tools (e.g., SIEM tools), based on application logs, firewall logs, etc. In certain public cloud environments, events are obtained using various methods such as cloud monitoring logs. In certain embodiments, the logs include events such as changes in VM state, change in ACLs, firewall rules, etc. In certain embodiments, anomalies include scanning activity (e.g., port scan, IP scan, network scan, timing-based activities such as unusual account activity, unexpected activity on an IP, spike in network activity, etc.). Certain embodiments herein detect anomalous activities using machine learning model (e.g., separate or as part of an ensemble of an attack inference engine). In certain embodiments, combining the discovered asset, application, and security findings with real-time events allows for the prioritization of the events and/or detection of any ongoing malicious activity.

Anomaly Detection: in certain embodiments, the security platform (e.g., security platform 100) detects anomalies within the network traffic of an enterprise. Certain embodiments take into account the diversity of the enterprise deployment (e.g., whether the assets are in different public clouds). In certain embodiments, a machine learning model is trained and used to detect anomalies, e.g., a classification, clustering, and/or time-based model. An algorithm such as Random Forest, K-Means, or Bayesian Model is used for the learning in certain embodiments.

In certain embodiments, network data contains information about the various network connections. To create an anomaly detection ML model, certain embodiments use several of these fields and use certain calculated fields, e.g., which overall define the features of the data set. In certain embodiments, the process of training the anomaly detection ML model involves providing training data to an ML algorithm, e.g., with the training data including one or any combination of: source IP (e.g., for traffic entering from internet 410 in FIG. 4), destination IP, source port, destination port, number of packets, number of bytes, bytes per packet within a time period, bytes per packet per destination port, bytes per packet per destination IP, frequency of source IP, frequency of destination IP, frequency of destination port, source IP (e.g., external, internal, local area network (LAN), etc.), number of subnets in a network, number of IPs in a subnet, number of distinct IPs seen in a time period (e.g., per day, per week, per month, etc.), source of the network data (e.g., cloud, on-premises, etc.), percentage of traffic based on network data, and geographic distribution of source IPs.

In certain embodiments these features are used to generate a traffic model for each enterprise deployment. In certain embodiments, the model is trained using the above features to obtain the required traffic model. In certain embodiments, this model is used to detect anomalies, e.g., one or any combination of host port scans (e.g., scan all ports on a host from same source), network port scans (e.g., scan several ports on several hosts from same source), network scans (e.g., detect active hosts in a network), too high or too low activity for a destination IP, too high or too low activity for a destination port, unexpected activity at a particular time for an IP, and/or unexpected high network activity within a network.

In certain embodiments, the anomaly output is combined with other security findings (e.g., vulnerabilities) to detect cyber activity happening in a particular environment.

Example Architecture

Figure 8:
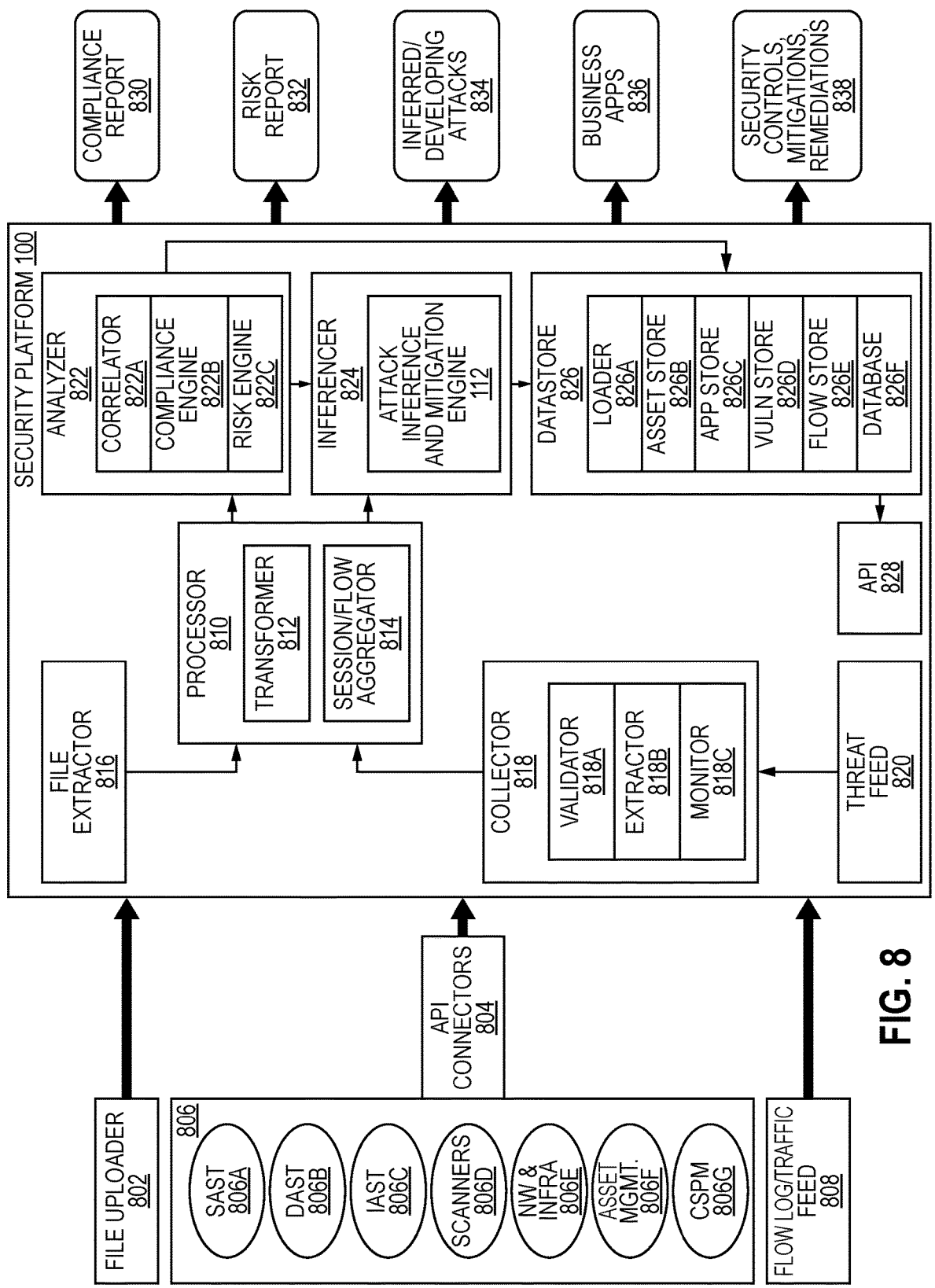
FIG. 8 is a block diagram of an example architecture of a security platform according to some embodiments.

FIG. 8 is a block diagram of an example architecture of a security platform 100 according to some embodiments.

In certain embodiments, security platform 100 is to extract information (e.g., anomaly information) via one or more API connectors 804 (e.g., of tools/products 806). In certain embodiments, tools 806 include one or any combination of SAST 806A, DAST 806B, IAST 806C, scanners 806D, network and infrastructure 806E tools, asset management tools 806F, and/or CSPM 806G.

In certain embodiments, the tools/products 806 provide access to information through their Application Programming Interface (API) served over HTTP/HTTPS. In certain embodiments, the security platform 100 connects to these tools/products 806 and extracts information by connecting to the APIs 804 provided by the tools/products.

In certain embodiments, file uploader 802 provide access to information, e.g., extracted by file extractor 816. For certain (e.g., legacy) products, API access might not be available, in which case, the data can be extracted through appropriate file uploads by file uploader 802. In certain embodiments, predefined file types and/or information are supported.

In certain embodiments, flow log/traffic feed 808 provides access to information. In certain embodiments, the traffic logs or in certain cases flow logs (e.g., public clouds) are periodically gathered to analyze the traffic patterns.

In certain embodiments, the collector 818 (e.g., service) has three functionalities. For example, (1) in certain embodiments, the collector's validator 818A (e.g., service) validates the API connector related information (e.g., API keys, authentication tokens, URLs, etc.) or in the case of file uploads, the relevant fields included. In certain embodiments, (2) the collector 818 (e.g., service) extracts the relevant information from the various feeds, for example, including the threat feed 820, which may include vulnerability information such as from a vulnerability database (e.g., national vulnerability database (NVD), bug bounty, external intelligence feeds, etc.). In certain embodiments, (3)

where the data related to assets, apps, services, network, infrastructure, and vulnerabilities is dynamic in nature, the monitor 818C (e.g., service) monitors for any changes (e.g., at regular intervals) and extracts the data accordingly.

In certain embodiments, the processor 810 (e.g., service) includes a transformer 812 (e.g., service) that performs transformation of the extracted data, for example, where the data retrieved from various sources is not uniform. In certain embodiments, the processed data includes information about assets, apps, services, network and vulnerabilities, and the required fields related to these. In certain embodiments, the session (e.g., flow) aggregator 814 (e.g., service) aggregates the flow/traffic logs into flows or sessions, so further analysis can be applied, e.g., and patterns observed accordingly.

In certain embodiments, the analyzer 822 (e.g., service) correlates the processed data such as those about assets, apps, services, network, and vulnerabilities. In certain embodiments, the traffic/flow patterns are correlated by the correlator 822A with the other extracted data to visualize the network architecture. In certain embodiments, the network architecture of a business application is thus presented accordingly, e.g., in a GUI. In certain embodiments, the compliance engine 822B (e.g., service) uses the vulnerability (e.g., and weakness) information to search for compliance issues and flag them. In certain embodiments, the risk engine 822C (e.g., service) calculates the cybersecurity risk scores for the various assets and business applications.

In certain embodiments, the inferencer 824 (e.g., service) includes attack inference (e.g., and mitigation) engine 112 (e.g., service). In certain embodiments, inferencer 824 (i) correlates the business application architecture with the vulnerability information and inference potential (e.g., likely) attack paths (e.g., the activity related to traffic/flows can further be overlayed on the attack paths, to show any developing or ongoing attacks) and/or (ii) proposes any mitigations or countermeasures in order to prevent any potential cybersecurity exploitation.

In certain embodiments, the datastore 826 (e.g., service) provides the interfaces used to store and/or retrieve the data in a database. In certain embodiments, the interface functionality is provided by the loader 826A. In certain embodiments, the various data is stored in logical data structures/ partitions (e.g., tables), e.g., asset store 826B, application store 826B, vulnerability store 826D, and/or flow store 826E. In certain embodiments, the relations between these various partitions are stored as well. In certain embodiments, the data stored in the database 826F is exposed through an application programming interface (API) 828, e.g., served on a web channel.

In certain embodiments, the security platform thus generates one or any combination (e.g., generates multi-fold results and is arranged as per the consumer of the information). In certain embodiments, there are various views shown on the user interface and corresponding reports can be generated such as compliance report 830, risk report 832, inferred/developing attacks 834 (e.g., attack paths), business applications 836 (e.g., as shown in FIGS. 4 and 7), and proposed security controls, mitigations, and/or recommendations 838 (e.g., as shown in FIG. 7).

(II) Methods for Prioritizing Security Findings Using Machine Learning Models

Certain embodiments herein are directed to methods for prioritizing security findings using machine learning models.

(III) Risk Scoring for Applications Based on Historical, Predictive, and Inherent Factors Certain embodiments herein are directed to risk scoring for applications based on historical, predictive, and inherent factors.

With the numerous security vulnerabilities existing today, it is hard to proactively identify and patch them. In order to prioritize remediation and mitigation efforts, risk scores are used in certain embodiments. In certain embodiments herein, the score calculation uses several factors such as, but not limited to, a Common Vulnerability Scoring System (CVSS) rating which forms the base score. In certain embodiments, the exposure of the application is weighted in to further adjust the score. Temporal factors such as age of exploit, effectiveness of exploit and active exploitation are used in determining the risk score in certain embodiments. In addition, in certain embodiments, the risk score is determined based on connectivity between various components of the application and the exploitability of those components. In certain embodiments, if security controls or remediations exist in the application environment, the information is used to adjust the risk score accordingly. Thus, such a calculated score is used to prioritize patching and mitigation efforts in certain embodiments.

(IV) Methods for Proposing Counter Measures for Security Vulnerabilities Using Contextual and Attack Prediction Patterns Certain embodiments herein are directed to methods for proposing counter measures for security vulnerabilities using contextual and attack prediction patterns.

Certain embodiments herein, using the context built around applications and the various entities involved, attack patterns could be identified, and attack paths predicted. However, an organization might not have security controls to stop the attacks and/or their controls might be insufficient. Based on the application contextual information, certain embodiments herein propose counter measure(s) to defend against the attacks. In certain embodiments, these measures are implemented through security devices and/or applications present in an environment.

(V) Methods for Vulnerability Assessment for Cloud Assets Using Imaging Methods

Certain embodiments herein are directed to methods for vulnerability assessment for cloud assets using imaging methods. Certain embodiments herein are directed to detecting vulnerabilities in network architecture and/or software application stacks using an imaging method, e.g., determining a machine image of the OS (e.g., kernel), VPN, and application layer (e.g., user and/or libraries) to determine vulnerability in a public cloud.

Certain embodiments herein are directed to an imaging method to analyze assets in a public cloud environment to obtain security related information such as services running, software packages installed, and the corresponding vulnerabilities associated therewith. In certain embodiments, such a method first uses the gathered information related to the virtual cloud assets. This could be achieved by interfacing with the public cloud APIs or using other tools that interface with the cloud APIs. In certain embodiments, a virtual machine (VM) in a public cloud environment is launched using a machine image, which contains information such as the operating system. In certain embodiments, the VM is associated with a virtual hard disk, e.g., where all the persistent information is stored. The virtual hard disk might have one or more virtual snapshots associated with it, e.g., where the snapshot is a copy of the virtual hard disk at a certain point in time. Certain public cloud providers have the provision to create a snapshot at any point in time. In certain embodiments, a VM in a public cloud environment is associated with virtual memory, where ephemeral data is stored and this also includes the run-time environment of certain processes. Certain public cloud providers provide the ability to attach a virtual disk to copy any ephemeral data to the disk. In certain embodiments, the combination of OS information, virtual hard disk, and a copy of the virtual memory provide an entire image of the running VM. Certain embodiments herein use the so created image for security analysis. Example operations to perform the analysis are outlined below, e.g., and may be expanded to include public cloud capabilities and/or the corresponding APIs provided thus forth.

In certain embodiments, the operations include one or any combination of: interfacing with the public cloud environment to obtain the list of VMs to be monitored by the security platform, querying the names and locations of the VMs and associated virtual disk and snapshot names and locations, creating an image of the monitored VMs for security analysis (e.g., with this action triggered at specified intervals or as per requirement), the image (e.g., including the OS information, virtual hard disk and copy of virtual memory) can be copied over to a different location to help in speeding up the analysis process, the image is parsed and analyzed by the security platform to obtain security related information (e.g., the information can include, but is but not limited to, the installed OS, installed application packages, running software, services running, applications associated with the services, containers running on the VM, and the associated application vulnerabilities), the file system of the VM can further be analyzed to retrieve any sensitive information and/or misconfigurations such as clear text passwords, the retrieved security information can be further enhanced using data from external sources such as vulnerability databases, security feeds, threat intelligence tools, etc., and to help with further analysis.

At least some embodiments of the disclosed technologies can be described in view of the following examples:

Example 1. A computer-implemented method comprising:
generating a profile for an enterprise that indicates one or more software application stacks and a network architecture for the one or more software application stacks;
determining one or more vulnerabilities of the one or more software application stacks and one or more vulnerabilities of the network architecture;
providing the one or more vulnerabilities of the one or more software application stacks, the one or more vulnerabilities of the network architecture, and the profile as input to a machine learning model;
generating an inference by the machine learning model that indicates one or more attack paths for an attacker in the one or more software application stacks and the network architecture; and
transmitting the inference to a storage location or a security software application.

Example 2. The computer-implemented method of example 1, wherein the profile indicates a web tier, an application tier, a firewall, and a database of the one or more software application stacks.

Example 3. The computer-implemented method of example 1, further comprising generating, based at least in part on the inference, a risk score of assets of the network architecture and the one or more software application stacks.

Example 4. The computer-implemented method of example 1, further comprising generating, based at least in part on the inference, a binary compliance status of assets of the network architecture and the one or more software application stacks.

Example 5. The computer-implemented method of example 1, further comprising:
determining a remediation based at least in part on the inference that indicates the one or more attack paths for the attacker, and
causing the remediation to be implemented for the enterprise.

Example 6. The computer-implemented method of example 5, further comprising displaying, by a graphical user interface, the one or more attack paths with an indication of a corresponding remediation for each attack path to the enterprise.

Example 7. The computer-implemented method of example 1, wherein deployment of the one or more software application stacks is on a private cloud of the enterprise and a public cloud.

Example 8. The computer-implemented method of example 1, further comprising displaying, by a graphical user interface, the one or more attack paths with an indication of a corresponding vulnerability for each attack path to the enterprise.

Example 9. The computer-implemented method of example 1, wherein the determining comprises:
generating an image of one or more virtual machines of a public cloud executing the one or more software application stacks; and
determining the one or more vulnerabilities of the one or more software application stacks from the image.

Example 10. The computer-implemented method of example 9, wherein the machine image comprises an indication of an installed operating system, installed application packages, software running, services running, applications associated with the services, and containers running on the one or more virtual machines.

Example 11. A computer-implemented method comprising:
generating a profile for an enterprise that indicates one or more software application stacks and a network architecture for the one or more software application stacks;
determining one or more vulnerabilities of the one or more software application stacks and one or more vulnerabilities of the network architecture;
determining one or more anomalies within network traffic of the network architecture;
providing the one or more vulnerabilities of the one or more software application stacks, the one or more vulnerabilities of the network architecture, the one or more anomalies within network traffic of the network architecture, and the profile as input to a machine learning model;
generating an inference by the machine learning model that indicates one or more attack paths for an attacker in the one or more software application stacks and the network architecture; and transmitting the inference to a storage location or a security software application.

Example 12. The computer-implemented method of example 11, wherein the determining the one or more anomalies within the network traffic of the network architecture comprises inferring the one or more anomalies by a second machine learning model.

Example 13. The computer-implemented method of example 12, further comprising, before the inferring by the second machine learning model, training the second machine learning model to detect a plurality of anomalies, within network traffic, comprising a host port scan of all ports on a host from a same source, a network port scan of several ports on several hosts from a same source, a network scan that detects active hosts in a network of the network architecture, too high or too low of activity for a destination Internet Protocol (IP) address, too high or too low of activity for a destination port, an unexpected activity at a particular time for an IP address, and an unexpected high network activity within the network.

Example 14. The computer-implemented method of example 11, further comprising generating, based at least in part on the inference, a binary compliance status of assets of the network architecture and the one or more software application stacks.

Example 15. The computer-implemented method of example 11, further comprising:
determining a remediation based at least in part on the inference that indicates the one or more attack paths for the attacker, and
causing the remediation to be implemented for the user.

Example 16. The computer-implemented method of example 15, further comprising displaying, by a graphical user interface, the one or more attack paths with an indication of a corresponding remediation for each attack path to the user.

Example 17. The computer-implemented method of example 11, wherein deployment of the one or more software application stacks is on a private cloud of the user and a public cloud.

Example 18. The computer-implemented method of example 11, further comprising displaying, by a graphical user interface, the one or more attack paths with an indication of a corresponding vulnerability and a corresponding anomaly for the one or more attack paths to the user.

Example 19. The computer-implemented method of example 11, wherein the determining comprises:
generating an image of one or more virtual machines of a public cloud executing the one or more software application stacks; and
determining the one or more vulnerabilities of the one or more software application stacks from the image.

Example 20. The computer-implemented method of example 19, wherein the image comprises an indication of an installed operating system, installed application packages, software running, services running, applications associated with the services, and containers running on the one or more virtual machines.

In yet another embodiment, an apparatus comprises a data storage device that stores code that when executed by a hardware processor causes the hardware processor to perform any method disclosed herein. An apparatus may be as described in the detailed description. A method may be as described in the detailed description.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium. Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

What is claimed is:

1. A computer-implemented method comprising:
generating a profile for an enterprise that indicates one or more software application stacks and a network architecture for the one or more software application stacks;
determining one or more vulnerabilities of the one or more software application stacks and one or more vulnerabilities of the network architecture;
providing the one or more vulnerabilities of the one or more software application stacks, the one or more vulnerabilities of the network architecture, and the profile as input to a machine learning model;
generating an inference by the machine learning model that indicates one or more attack paths for an attacker in the one or more software application stacks and the network architecture; and
transmitting the inference to a storage location or a security software application.

2. The computer-implemented method of claim 1, wherein the profile indicates a web tier, an application tier, a firewall, and a database of the one or more software application stacks.

3. The computer-implemented method of claim 1, further comprising generating, based at least in part on the inference, a risk score of assets of the network architecture and the one or more software application stacks.

4. The computer-implemented method of claim 1, further comprising generating, based at least in part on the inference, a binary compliance status of assets of the network architecture and the one or more software application stacks.

5. The computer-implemented method of claim 1, further comprising:
determining a remediation based at least in part on the inference that indicates the one or more attack paths for the attacker, and causing the remediation to be implemented for the enterprise.

6. The computer-implemented method of claim 5, further comprising displaying, by a graphical user interface, the one or more attack paths with an indication of a corresponding remediation for each attack path to the enterprise.

7. The computer-implemented method of claim 1, wherein deployment of the one or more software application stacks is on a private cloud of the enterprise and a public cloud.

8. The computer-implemented method of claim 1, further comprising displaying, by a graphical user interface, the one or more attack paths with an indication of a corresponding vulnerability for each attack path to the enterprise.

9. The computer-implemented method of claim 1, wherein the determining comprises:
generating an image of one or more virtual machines of a public cloud executing the one or more software application stacks; and
determining the one or more vulnerabilities of the one or more software application stacks from the image.

10. The computer-implemented method of claim 9, wherein the image comprises an indication of an installed operating system, installed application packages, software running, services running, applications associated with the services, and containers running on the one or more virtual machines.

11. A computer-implemented method comprising:
generating a profile for an enterprise that indicates one or more software application stacks and a network architecture for the one or more software application stacks;
determining one or more vulnerabilities of the one or more software application stacks and one or more vulnerabilities of the network architecture;
determining one or more anomalies within network traffic of the network architecture;
providing the one or more vulnerabilities of the one or more software application stacks, the one or more vulnerabilities of the network architecture, the one or more anomalies within network traffic of the network architecture, and the profile as input to a machine learning model;
generating an inference by the machine learning model that indicates one or more attack paths for an attacker in the one or more software application stacks and the network architecture; and
transmitting the inference to a storage location or a security software application.

12. The computer-implemented method of claim 11, wherein the determining the one or more anomalies within the network traffic of the network architecture comprises inferring the one or more anomalies by a second machine learning model.

13. The computer-implemented method of claim 12, further comprising, before the inferring by the second machine learning model, training the second machine learning model to detect a plurality of anomalies, within network traffic, comprising a host port scan of all ports on a host from a same source, a network port scan of several ports on several hosts from a same source, a network scan that detects active hosts in a network of the network architecture, too high or too low of activity for a destination Internet Protocol (IP) address, too high or too low of activity for a destination port, an unexpected activity at a particular time for an IP address, and an unexpected high network activity within the network.

14. The computer-implemented method of claim 11, further comprising generating, based at least in part on the inference, a binary compliance status of assets of the network architecture and the one or more software application stacks.

15. The computer-implemented method of claim 11, further comprising:
determining a remediation based at least in part on the inference that indicates the one or more attack paths for the attacker, and
causing the remediation to be implemented for the enterprise.

16. The computer-implemented method of claim 15, further comprising displaying, by a graphical user interface, the one or more attack paths with an indication of a corresponding remediation for each attack path to the enterprise.

17. The computer-implemented method of claim 11, wherein deployment of the one or more software application stacks is on a private cloud of the enterprise and a public cloud.

18. The computer-implemented method of claim 11, further comprising displaying, by a graphical user interface, the one or more attack paths with an indication of a corresponding vulnerability and a corresponding anomaly for the one or more attack paths to the enterprise.

19. The computer-implemented method of claim 11, wherein the determining comprises:
generating an image of one or more virtual machines of a public cloud executing the one or more software application stacks; and
determining the one or more vulnerabilities of the one or more software application stacks from the image.

20. The computer-implemented method of claim 19, wherein the image comprises an indication of an installed operating system, installed application packages, software running, services running, applications associated with the services, and containers running on the one or more virtual machines.

* * * * *